Aug. 19, 1958  E. SCHLACHTER  2,847,980
INTERNAL COMBUSTION ENGINE HAVING A STEAM
VAPORIZING ATTACHMENT
Filed Dec. 19, 1955  2 Sheets-Sheet 1

Edmund Schlachter
INVENTOR.

Aug. 19, 1958
E. SCHLACHTER
2,847,980
INTERNAL COMBUSTION ENGINE HAVING A STEAM VAPORIZING ATTACHMENT
Filed Dec. 19, 1955
2 Sheets—Sheet 2
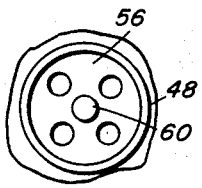
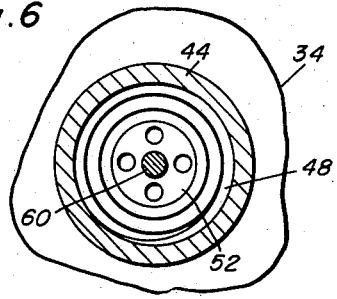
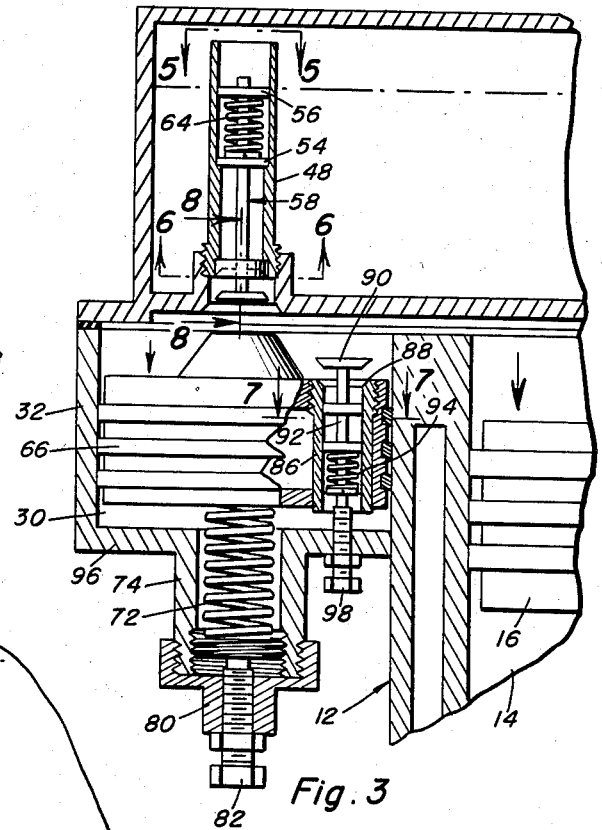
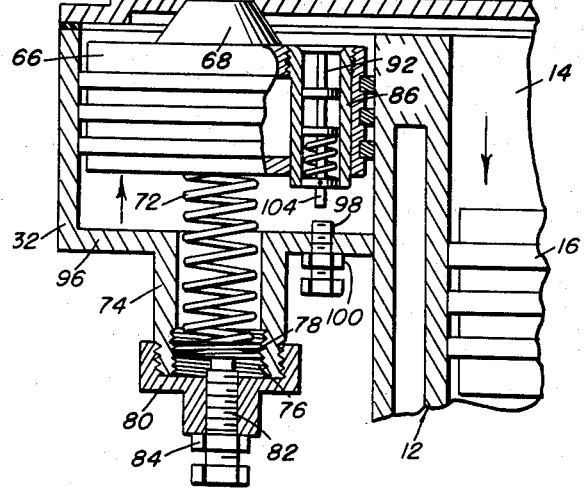
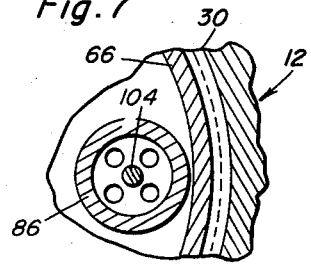
Edmund Schlachter
INVENTOR.
BY *Clarence A. O'Brien*
*and Harvey B. Jacobson*
Attorneys

United States Patent Office 2,847,980
Patented Aug. 19, 1958

2,847,980

INTERNAL COMBUSTION ENGINE HAVING A STEAM VAPORIZING ATTACHMENT

Edmund Schlachter, Grand Blanc, Mich.

Application December 19, 1955, Serial No. 553,908

8 Claims. (Cl. 123—25)

This invention relates in general to new and useful improvements in internal combustion engines, and more specifically to an internal combustion engine having a steam vaporizing attachment.

It has been determined that under ordinary conditions fuel firing in the cylinder of an internal combustion engine forms a momentary explosive force on the piston and then quickly subsides thereby not giving complete pressure on the piston throughout the length of the strokes thereof. Further, it has been found that by introducing a suitable water vapor with the fuel gases that the burning of the fuel may be slowed to the point whereby pressure remains substantially constant thereby permitting a much greater transfer of power to the piston of the internal combustion engine. However, the water vapor is normally introduced with the fuel and there is no control as to the timing of the injection of the water vapors. This results in a reduction in the efficiency over that which may possibly be obtained by the timed injection of such water vapors.

It is therefore the primary object of this invention to provide an internal combustion engine which is provided with an attachment for injecting water vapor into the cylinder or cylinders thereof in timed sequence.

Another object of this invention is to provide an improved internal combustion engine having a water vapor injection system, the injection system including a steam boiler in the form of a head of the internal combustion engine and there being provided suitable means for controlling the timed injection of such steam into the chamber of each cylinder.

Another object of this invention is to provide an improved injection system for use in conjunction with an internal combustion engine for injecting water vapor thereinto, the injection system being controlled by the firing of gases within a cylinder so that the water vapor is injected in timed relation to such firing.

A further object of this invention is to provide an improved internal combustion engine having a water vaporizing attachment for injecting water vapor into a cylinder thereof, the water vapor being in the form of steam and there being suitable valve means for controlling the flow of the steam into the cylinder in timed response to the firing of the gases in the cylinder.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2:
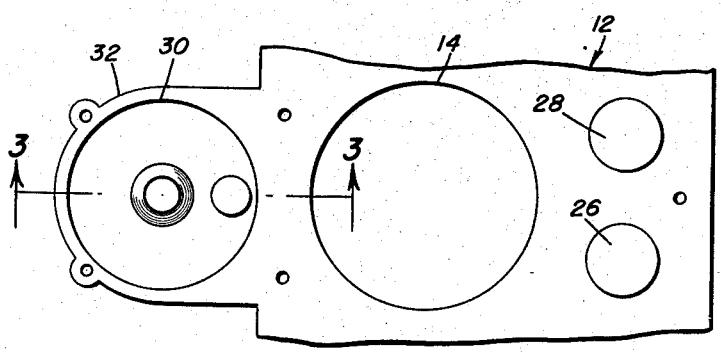
Figure 2 is a fragmentary plan view of the block of the internal combustion engine of Figure 1 and shows the same with the head thereof removed and the details of the auxiliary cylinder which is associated with one of the cylinders thereof, the auxiliary cylinder having means therein for controlling the injection of steam vapor into the main cylinder of the internal combustion engine.
Figure 8:
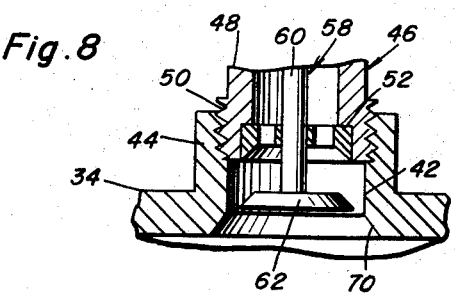

Figure 3 is an enlarged fragmentary sectional view taken substantially upon the plane indicated by the section line 3—3 of Figure 2 and shows the specific details of the control for controlling the injection of steam vapor into the main cylinder of the internal combustion engine, the main piston of the main cylinder being shown in a position after reaching top dead center and having the fuel in the main cylinder fired, the control for injecting steam into the main cylinder being moved to an opened position;

Figure 4 is a sectional view similar to Figure 3 and shows the main piston after travelling further downwardly and the control for injecting steam into the main cylinder being returned to a closed position;

Figure 5 is an enlarged fragmentary sectional view taken substantially upon the plane indicated by the section line 5—5 of Figure 3 and shows the specific details of an upper end of the steam passage and the manner in which a check valve is mounted thereon;

Figure 6 is an enlarged fragmentary sectional view taken substantially upon the plane indicated by the section line 6—6 of Figure 3 and shows further the details of the check valve;

Figure 7 is an enlarged fragmentary horizontal sectional view taken substantially upon the plane indicated by the section line 7—7 of Figure 3 and shows the specific details of a by-pass valve carried by an auxiliary piston which controls the injection of steam vapors into the main cylinder; and Figure 8 is an enlarged fragmentary sectional view taken substantially upon the plane indicated by the section line 8—8 of Figure 3 and shows the specific details of the check valve.

Referring now to the drawings in detail, it will be seen that there is illustrated an internal combustion engine which is referred to in general by the reference numeral 10. The internal combustion engine 10 includes a block which is referred to in general by the reference numeral 12. Formed in the block 12 is a plurality of cylinders 14 which will be considered main cylinders. Mounted within each cylinder 14 for vertical reciprocation is a main piston 16 which has connected thereto a connecting rod 18. The opposite end of the connecting rod (not shown) is connected to a conventional type of crank shaft also not shown. The block 12 is provided with a suitable water jacket 20 for the cooling of the cylinder 14.

In order that the flow of fuel into the cylinder 14 may be controlled, there is provided a suitable intake passage 22 in the block 12. The intake passage 22 has connected thereto in communication therewith an intake manifold 24. The flow of fuel through the intake passage 22 into the cylinder 14 is controlled by an intake valve 26. A similar valve 28 functions as an exhaust valve in the conventional manner.

Figure 1:
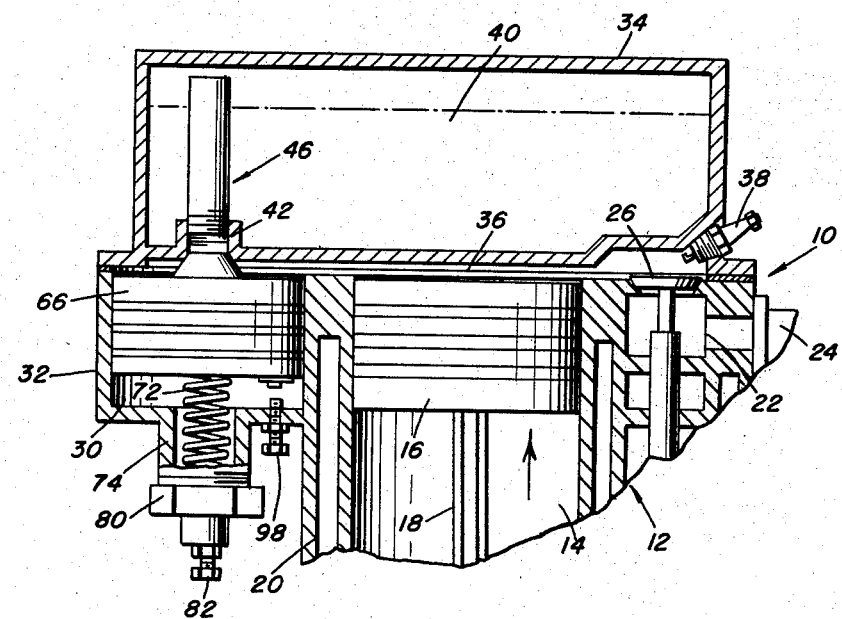
Figure 1 is a fragmentary vertical sectional view taken through an internal combustion engine which is provided with the steam vaporizing attachment which is the subject of this invention and shows the piston of one cylinder of the internal combustion engine as it approaches the upper end of its compression stroke.

In addition to the main cylinder 14 there is provided an auxilary cylinder 30 for each main cylinder 14. Each of the auxiliary cylinders 30 is formed in a projection 32 of the block 12. The projection 32, as is best illustrated in Figure 1, is relatively shallow. Overlying the top of the block 12 and closing the upper end of each of the main cylinders 14 and each of the auxiliary cylinders 30 is a head 34. The underside of the head 34 is recessed to form a firing chamber 36 which overlies both the main cylinder 14 and auxiliary cylinder 30. Further, the firing chambers overlies the valves 26 and 28. Carried by the head 34 of each of the main cylinders 14 and extending into the firing chamber 36 is a spark plug 38. It is to be understood that the operation of the internal combustion engine 10 will be the same as any other type of internal combustion engine with the exception of the details of the steam vaporizing attachment of which the cylinder 30, the projection 32 and the head 34 are parts. Accordingly, a further description of the operation of the internal combustion engine 10 will now be set forth in detail hereinafter.

The head 34 differs from the ordinary type of cylinder head in that it is relatively deep and is provided with a suitable water supply 40. Further, the cylinder head 34 has formed in the underside thereof in alignment with the center of the auxiliary cylinder 30 an exhaust port 42. The exhaust port 42 is defined by an integral sleeve 44 which extends up into the confines of the head 34. In the operation of the internal combustion engine 10, the water supply 40 is heated from the heat of the gases firing in the cylinders 14 with the result that steam is generated in the head 34. The exhaust port 42 is intended to convey steam from the head 34 into the firing chamber 36 for mixing with the burning gases in the cylinder 14 and the firing chamber 36 above the main piston 16.

In order to limit the flow of gases through the exhaust port 42 to steam from the head 34, there is carried by the sleeve 44 a check valve assembly which is referred to in general by the reference numeral 46. The check valve assembly 46 includes a tubular housing 48 which is open at both ends thereof. The tubular housing 48 has an externally threaded lower portion 50 which is threaded engaged in the upper part of the sleeve 44.

Removably seated in the lower part of the housing 48 there is a ported valve seat 52. Also, carried by the housing 48 intermediate the ends thereof is an intermediate ported valve guide 54 and an upper ported guide valve 56. The valve seat 52 also functions as a lower valve guide, as is best illustrated in Figure 8.

The check valve assembly 46 also includes a valve member which is referred to in general by the reference numeral 58. The valve member 58 includes an upright valve stem 60 and a lower valve head 62. The valve stem 60 is slidably received in the valve seat 52 and the intermediate valve guide 54 and carries therewith the upper valve guide 56. Carried by the upper portion of the valve stem 60 is a spring 64 which rests upon the intermediate valve guide 54 and urges the valve 58 and the upper valve guide 56 upwardly so that the head 62 engages the valve seat 52 to close the lower end of the housing 48 and prevent the accidental loss of water and light steam from the head 34. It is to be understood that steam enters the upper end of the housing 48 and due to the pressure of such steam, the valve 58 is moved to an open position. If the steam pressure within the head 34 is not sufficient to overcome the tension of the spring 64, the check valve assembly 46 remains closed.

Slidably mounted within the auxiliary cylinder 30 is an auxiliary piston 66. The auxiliary piston 66 has formed on the upper end thereof a centrally located valve member 68. The valve member 68 is aligned with the exhaust ports 42 and cooperates with a valve seat 70 formed at the lower end of the exhaust port 42 or selectively closing the exhaust port 42.

In order that the valve member 68 may cooperate with the valve seat 70 to prevent the escape of steam through the exhaust port 42 except in timed relation as desired, the piston 66 is urged upwardly by means of a coil spring 72 which engages the underside thereof. The coil spring has the lower portion thereof seated within a downwardly projecting extension 74 of the projection 32. The extension 74 is internally threaded as at 76 and is provided with an adjustable stop member 78 which is threadedly positioned therein. The lower end of the extension 74 is closed by a tubular cap 80 having a locking screw 82 threadedly engaged therein. The lock screw 82 is locked in adjusted position by means of a lock nut 84. The upper end of the lock screw 82 engages the underside of the adjustable stop member 78 and retains it in adjusted position. By adjusting the stop member 78, the tension of the spring 72 may be varied as desired.

Positioned in the piston 66 and extending therethrough is a by-pass port forming member 86. The by-pass port forming member 86 has formed at the upper end thereof a valve seat 88. Selectively engaged with the valve seat 88 is a head 90 of a valve 92. The valve head 90 engages the valve seat 88 to close the by-pass port forming member 86. The valve 92 is mounted within the by-pass port forming member 86 in the conventional manner and is urged to a closed position by a tension spring 94.

Theadedly engaged in a bottom wall 96 of the projection 32 is a stop screw 98. The stop screw 98 is retained in adjusted position by a lock nut 100. The valve 92 includes a depending valve stem 104 which is aligned with the stop screw 98 and which is engageable with the upper end of the stop screw 98.

In the operation of the present invention, the steam vaporizing attachment does not function until such time as the water supply 40 has been heated to the point where steam is formed and such stem is obtained sufficient pressure within the head 34 for the purpose of moving the check valve 58 to an opened position such as that illustrated in Figure 3.

After the steam pressure has been built up in the head 34, when the main piston 16 is positioned otherwise than during a firing stroke, the auxiliary piston 66 is retained in its uppermost position by the tension spring 72. Thus the valve member 68 cooperates with the valve seat 70 to prevent the passage of steam from the head 34 into the firing chamber 36. However, when the piston 16 reached the uppermost end of its compression stroke and the fuel within the combustion chamber 36 is fired by the spark plug 38, the pressure exerted within the firing chamber 36 is sufficient to urge the auxiliary piston 66 downwardly in the manner best illustrated in Figure 3. As the auxiliary piston 66 moves downwardly, the stop screw 98 engages the lower end of the valve stem 104 and moves the valve 92 to an opened position so that the pressures in the cylinder 30 above and below the piston 66 are equalized and the spring 72 again becomes the controlling force on the piston 66, such as is clearly illustrated in Figure 3.

As the auxiliary piston 66 moves downwardly the valve member 68 moves out of engagement with the valve seat 70 and steam is ejected into the firing chamber 36 and mixes with the burning fuel in the main cylinder 14 to retard the burning of such gases and thereby give even pressures on the head of the piston 16 throughout a major length of its downward travel.

After the auxiliary piston 66 moves downwardly to the position illustrated in Figure 3, the explosive gas pressure within the firing chamber 36 and the auxiliary cylinder 30 above and below the piston 66 is equalized. At this time the spring 72 again returns the auxiliary piston 66 to its uppermost position with the valve member 68 engaging the valve seat 70 to close the exhaust port 42, as is best illustrated in Figure 4. At this time the main piston 16 is still being moved downwardly by the burning of the gases within the upper part of the main cylinder 14. However, the desired amount of steam has been injected into the main cylinder 14 along with the burning fuel and the desired injection of water vapor has been accomplished.

The auxiliary piston 66 being controlled by the firing of the fuel within the main cylinder 14, it will be readily apparent that the injection of steam into the main cylinder 14 is in the desired time sequence with the initial firing of the fuel. The amount of steam and the time of injection will be controlled by the stop screw 98. By varying the position of the set screw 98, the opening of the valve 92 may be controlled thus controlling the length of time of injection of the steam into the main cylinder 14 by controlling the time the piston 66 is in a lowered position. Further, the time of movement of the auxiliary piston 66 to a position whereby the exhaust port 42 is opened may be controlled by varying the tension of the spring 72. The adjustment of the tension spring 72 also results in the auxiliary piston 66 being moved upwardly again at an earlier time. By varying the adjustment of the stop member 78 and the stop screw 98, the desired timed relationship of injection may be obtained.

Although the present invention is primarily designed for injecting water vapors, the valve system described may be used for the injection of fuel with the valve system being operated by normal maximum compression forces in the cylinders.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination with an internal combustion engine of the type including at least one cylinder and one piston, a steam vaporing attachment comprising a head for said cylinder, said head being in the form of a combined water jacket and steam boiler, and means for introducing steam from said head into said cylinder in timed sequence to the igniting of fuel in said cylinder, said means including a valve movable to an open position in response to explosive pressures within said cylinder.

2. In combination with an internal combustion engine of the type including at least one cylinder and one piston, a steam vaporing attachment comprising a head for said cylinder, said head being in the form of a combined water jacket and steam boiler, means for introducing steam from said head into said cylinder in timed sequence to the igniting of fuel in said cylinder, said means including a valve movable to an open position in response to explosive pressures within said cylinder, and means for closing said valve in timed relation to the opening thereof.

3. In combination with an internal combustion engine of the type including at least one cylinder and one piston, a steam vaporing attachment comprising a head for said cylinder, said head being in the form of a combined water jacket and steam boiler, means for introducing steam from said head into said cylinder in timed sequence to the igniting of fuel in said cylinder, and a check valve in said head for limiting the flow of gases between said head and said cylinder to flow of steam from said head.

4. In combination with an internal combustion engine of the type including at least one cylinder and one piston, a steam vaporing attachment comprising a head for said cylinder, said head being in the form of a combined water jacket and steam boiler, means for introducing steam from said head into said cylinder in timed sequence to the igniting of fuel in said cylinder, said means including a valve movable to an open position in response to explosive pressures within said cylinder, means for closing said valve in timed relation to the opening thereof, and a check valve in said head for limiting the flow of gases between said head and said cylinder to flow of steam from said head.

5. In combination with an internal combustion engine of the type including at least one cylinder and one piston, a steam vaporing attachment comprising a head for said cylinder, said head being in the form of a combined water jacket and steam boiler, and means for introducing steam from said head into said cylinder in timed sequence to the igniting of fuel in said cylinder, said means including an auxiliary cylinder communicated with the first mentioned cylinder, an auxiliary piston in said auxiliary cylinder, a steam escape port in said head, a valve member carried by said auxiliary piston, a spring in said auxiliary piston towards said head and normally retaining said valve member in a port closing position.

6. In combination with an internal combustion engine of the type including at least one cylinder and one piston, a steam vaporing attachment comprising a head for said cylinder, said head being in the form of a combined water jacket and steam boiler, means for introducing steam from said head into said cylinder in timed sequence to the igniting of fuel in said cylinder, said means including an auxiliary cylinder communicated with the first mentioned cylinder, an auxiliary piston in said auxiliary cylinder, a steam escape port in said head, a valve member carried by said auxiliary piston, a spring in said auxiliary piston towards said head and normally retaining said valve member in a port closing position, and a check valve in said head for limiting the flow of gases between said head and said cylinder to flow of steam from said head.

7. In combination with an internal combustion engine of the type including at least one cylinder and one piston, a steam vaporing attachment comprising a head for said cylinder, said head being in the form of a combined water jacket and steam boiler, means for introducing steam from said head into said cylinder in timed sequence to the igniting of fuel in said cylinder, said means including an auxiliary cylinder communicated with the first mentioned cylinder, an auxiliary piston in said auxiliary cylinder, a steam escape port in said head, a valve member carried by said auxiliary piston, a spring in said auxiliary piston towards said head and normally retaining said valve member in a port closing position, and a by-pass opening through said auxiliary piston for equalizing pressures above and below said auxiliary piston whereby said spring may return said piston to said port closing position.

8. In combination with an internal combustion engine of the type including at least one cylinder and one piston, a steam vaporing attachment comprising a head for said cylinder, said head being in the form of a combined water jacket and steam boiler, means for introducing steam from said head into said cylinder in timed sequence to the igniting of fuel in said cylinder, said means including an auxiliary cylinder communicated with the first mentioned cylinder, an auxiliary piston in said auxiliary cylinder, a steam escape port in said head, a valve member carried by said auxiliary piston, a spring in said auxiliary piston towards said head and normally retaining said valve member in a port closing position, and a by-pass opening through said auxiliary piston for equalizing pressures above and below said auxiliary piston whereby said spring may return said piston to said port closing position, a by-pass valve controlling said by-pass opening, means engageable with said by-pass valve for moving said by-pass valve to an open position in response to movement of said piston away from said head.

References Cited in the file of this patent

UNITED STATES PATENTS

| 1,122,770 | Lake | Dec. 29, 1914 |
| 1,245,188 | Buckwalter | Nov. 6, 1917 |
| 2,748,755 | McCutcheon | June 5, 1956 |